Nov. 17, 1959  E. P. G. WRIGHT ET AL  2,913,527
TELECOMMUNICATION EXCHANGE SYSTEMS
Filed April 14, 1954  9 Sheets-Sheet 1

Inventors
E. P. G. WRIGHT · J. RICE
By Robert Harding
Attorney

FIG. 8.

United States Patent Office 2,913,527
Patented Nov. 17, 1959

2,913,527

TELECOMMUNICATION EXCHANGE SYSTEMS

Esmond Philip Goodwin Wright and Joseph Rice, London, England, assignors to International Standard Electric Corporation, New York, N.Y.

Application April 14, 1954, Serial No. 423,122

Claims priority, application Great Britain April 17, 1953

7 Claims. (Cl. 179—7)

This invention relates to telecommunication exchange systems with special reference to calling line identification systems for use therein. Calling line identification systems are of particular use in subscriber and operator toll dialling systems for metering purposes, but are not restricted to such use.

According to the invention, there is provided a telecommunication exchange equipment comprising a group of substation line circuits, metering signal transmitting equipment for transmitting metering signals to said line circuits, identification signal transmitting equipment for transmitting identification signals to said line circuits, said metering and identification signals being sent over the same channels but being different in character, equipment for recording metering information for each substation of said group, means for scanning said equipments for metering purposes, means for generating a cycle of pulses, one per equipment, during said scanning operation, two sets of coincidence devices, one set for metering and one set for identification, each set being equal in number to the number of lines in said group of line circuits and each coincidence device being individual to a corresponding line circuit, impulse counting means for counting said impulse cycle, number recording means for recording identities, and transfer equipment operable under control of said identification coincidence devices for transferring the number recorded by said counting means to said recording means, whereby a metering signal on a line will activate the corresponding metering coincidence device and an identification signal on a line will activate the corresponding identification coincidence device.

The identification system to be described provides an economical and simple method of obtaining the identity of a calling line by using part of apparatus provided for local fee metering based on the use of some form of memory device, for example, a magnetic drum, for registering the calls. It is a feature of such local metering systems that all lines served are examined at frequent and regular intervals, e.g. once per cycle of the memory device, and details relating thereto are reprinted electrically on each examination (or added to as required), whereby the identity of each subscriber's record must be, and is, available for controlling the record.

A system of this character is fully described in our copending application Serial No. 289,386, filed May 21, 1952, while the copending application Serial No. 379,422, filed September 10, 1953, now Patent No. 2,850,571, describes a similar system for multi-free metering, with which a calling line identification system may also be associated. Both of these systems will be referred to in more detail hereafter. In these systems, a metering pulse train is used in place of the applied battery for metering purposes in conventional subscriber metering arrangements, and in the present invention, an identification pulse train, staggered in time in relation to the metering pulse train, is employed to transfer the identity of the calling subscriber's meter record to a local register for use as required. In a system of this character, precautions must be taken to ensure that identification pulses do not initiate metering, nor vice versa, so making it possible to pass both forms of pulses via the subscriber's P-wires.

The invention will be described with reference to the accompanying drawings illustrating a preferred embodiment, in which the memory store assumed is a magnetic drum or disc, and also in its relation to the metering systems described in the copending applications above referred to.

In the accompanying drawings,

Fig. 2A shows the essential part of a standard circuit for applying a metering waveform to a subscriber's P-wire, while Fig. 3 shows a part of Figs. 27 and 28 of said Patent No. 2,850,571, similarly modified. In both of these figures, the original circuit conventions have been retained, although these are not now in accordance with the established conventions used in the remaining figures of the drawings. No confusion will, however, result from this.

Fig. 7, (a) and (b) show respectively the metering pulses (S and Z pulses) produced during one cycle of a standard meter pulse machine, and the pulses as modified for use with the identification arrangements, shown in Fig. 7(b) as identified pulses, IP, and metering waveform MW. The one is the inverse of the other. These are shown as applied particularly to the multi-fee metering system of said Patent No. 2,850,571.

The time required for the initiation of identification, the recording of the calling line number in the correct calling line register and the release of the identification initiating circuit would be of the order 100 m.secs. This makes it possible to use a circuit arrangement in which one line only in the exchange is marked by the identification signal at any time so avoiding the use of more complex arrangements to prevent cross identification.

Before passing on to a detailed description of the circuit operation based on the drawings referred to, a brief description of the circuit conventions and electronic tools used is desirable.

The use of a magnetic drum and temporary storage therein has been described in a number of prior applications, e.g. those mentioned above, and in this specification the term "storage device" or "store" means a device in which intelligence can be recorded by creating internal strains in the material of the store, and in which stored intelligence or predetermined portions thereof can be detected by detecting the state of the strain in the material or in corresponding portions thereof.

Examples of internal strains which are used to store intelligence are magnetisations of either one of two polarities, as in the magnetic drum, tape or wire, or in the static magnetic matrix, electrifications of either one of two polarities as in the ferro-electric storage matrix, electric charges of either one of two polarities as in the cathode ray tube storage device, and compression waves in acoustic delay lines such as mercury delay lines and magneto-strictive delay lines.

The term "store" as used in the present specification should therefore be interpreted to include any device falling within the terms of this definition, and in any case includes all the examples listed in the preceding paragraph.

The magnetic drum form of storage consists, for example, of a hollow brass drum having a magnetic skin on its cylindrical surface. This skin provides a number of closely spaced peripheral tracks, with each of which there is associated a recording head and a reading head. Each track provides a number of separate stores and the drum is mounted on a spindle rotatable at high speed by an electric motor.

Intelligence is recorded in the form of successive contiguous longitudinal magnetisations of either one of two kinds, which can conveniently be designated "0" or zero and "1." Hence it will be seen that when numbers are recorded they are conveniently recorded in binary digital code although other code forms are possible. When a recording is to be altered this is done by recording on top of the former recording, i.e. by the magnetic recording technique known as "overprinting."

Each track is divided into a number of separated lengths of track by magnetic markings or the like which leave no physical indication of this division on the actual track. The recording and reading heads are spaced from one another, so that the recorded intelligence is read off, and re-recorded in a different angular position, this being effected with each modification of the recording as is necessary. A system of this type is described in our co-pending application referred to, namely No. 289,386.

Additional to the tracks on which intelligence is stored there is a track having a recording per element position on all storage tracks. Associated with this track, known as the element or "clock" track, there is a read head known as the "clock" head from which is derived a pulse per element position. As is described in the said prior applications, this clock pulse cycle is used to derive a set of three narrow pulses per element pulse, namely $t_1$, $t_2$ and $t_3$. (Only $t_2$ and $t_3$ are, however, required for the circuit of Patent No. 2,850,571.) A further additional track has a recording at the first element position of each storage section. This track is known as the marker track, and has a read head known as the "marker" head associated with it. This gives a pulse cycle which defines the commencement of each of the storage sections. A third pulse cycle, known as the SY pulse cycle, defines the commencement of the first of the storage sections, for phasing the 61C and 62C counters of Fig. 6, to be described. These three pulse cycles, the clock pulse cycle, the marker pulse cycle and the SY pulse cycle, are used to control all operations.

Electronic gates, well-known per se, are shown as circles with incoming controls shown as radial leads with arrow-heads touching the circle, and are given references including the letter G. The figure within the circle denotes the number of simultaneous incoming controls required to be applied to the gate to cause it to open.

The remaining conventions to be described are those for bi-stable registers, or flip-flops, counters, multi-stable registers and pulse inverters.

Figure 5:
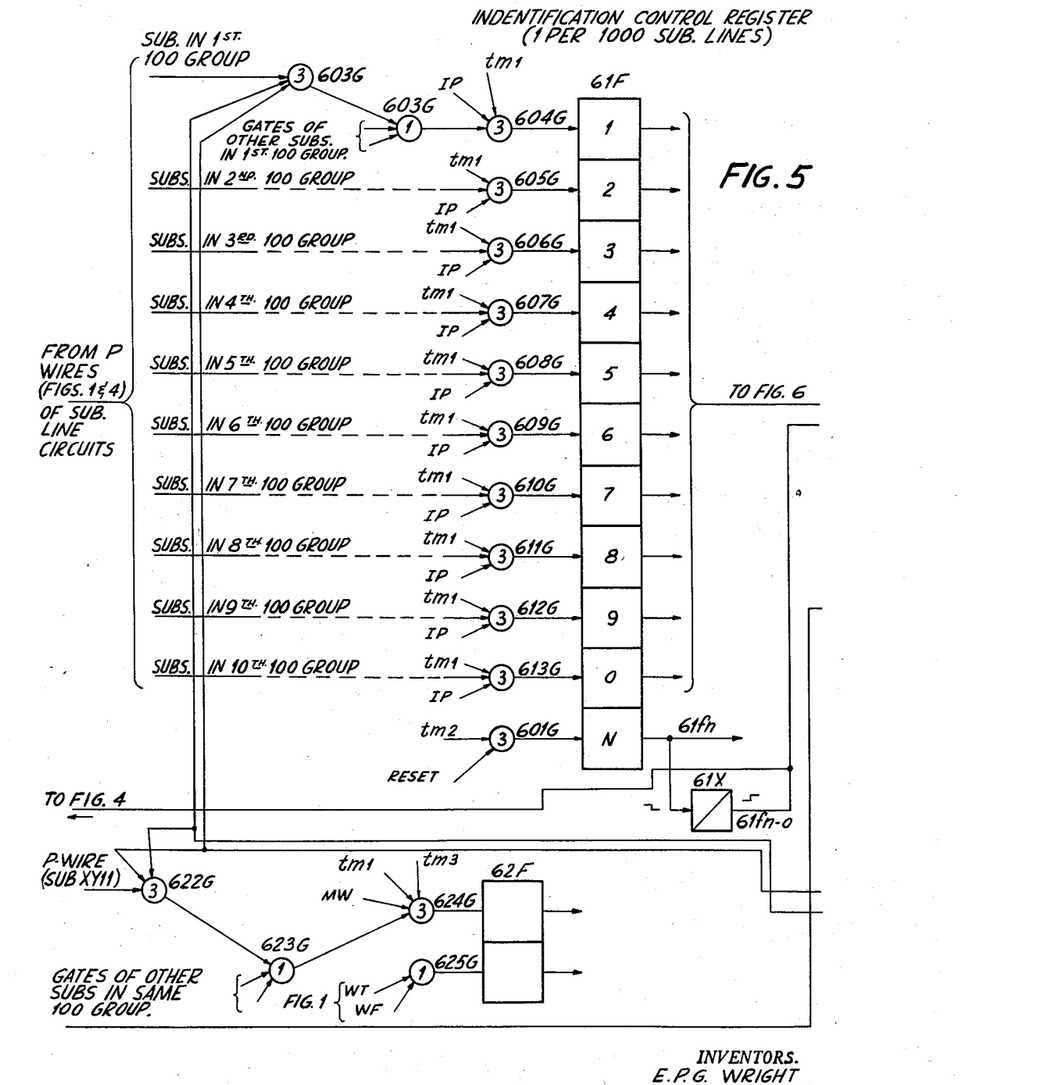
Fig. 5 shows the identification control register, 61F, of which there would be one per 1000 subscribers for the assumed metering arrangement and part of the metering addition circuit, 62F, of which there would be one for each track on the metering record drum; 62F corresponds to F2 in Fig. 3.
Figure 6:
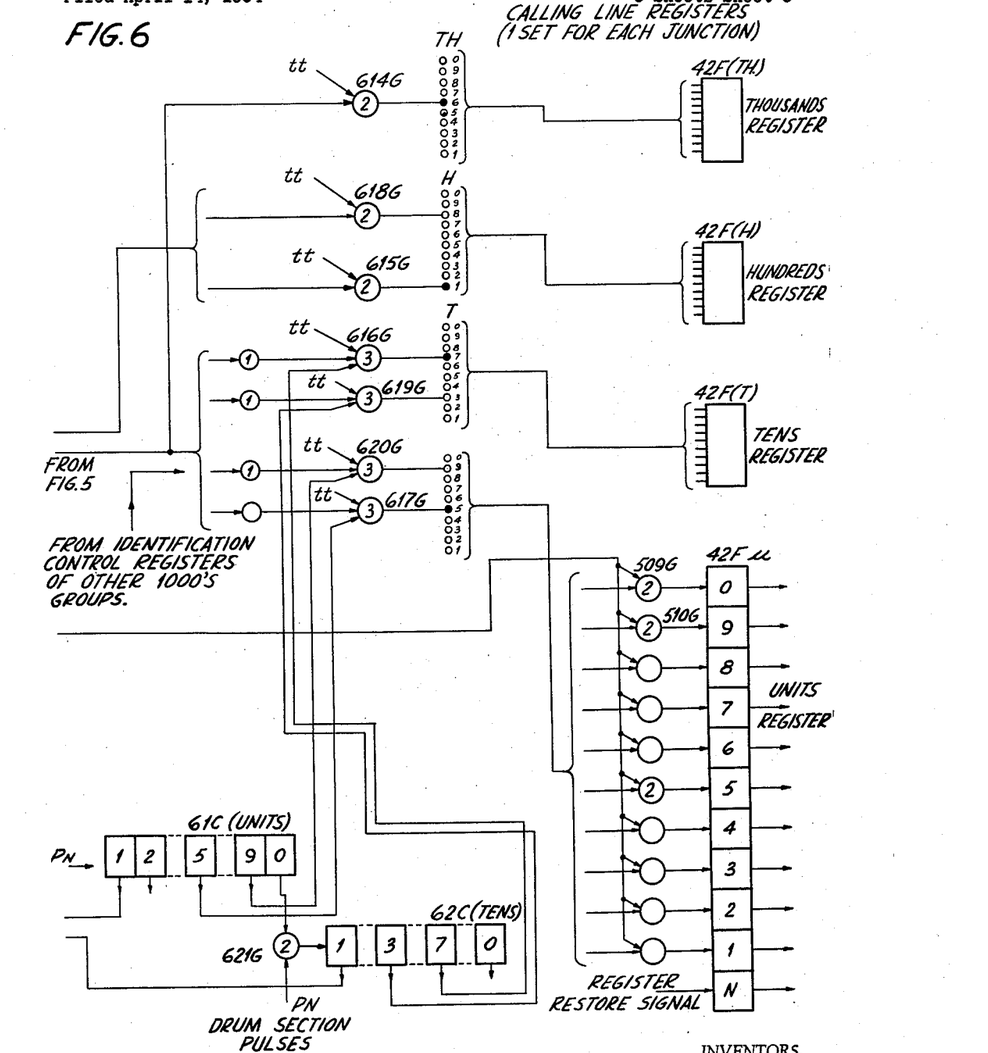
Fig. 6 shows the calling line registers and the control circuits therefor, and also the metering section counters, 61C and 62C, controlled from the magnetic drum and dividing each metering track thereon into its separate metering sections.

A counter comprising a number of single-component stages each of which is capable of assuming one of two conditions, on or off, is shown as a series of rectangles drawn in linear array, e.g. 61C, 62C, Fig. 6. The counters shown all count to the end of their cycle and then reset during ordinary operation. A multi-stable register, e.g. 61F, Fig. 5, is shown in a similar manner to a counter except that the larger dimension of each rectangle is drawn vertical whereas in the case of a counter it is drawn horizontal. A multi-stable register is similar to a counter, but it does not usually run through its full cycle. Like a counter it has only one stage operated at once, and depending on circumstances any stage can operate next after that, rendering the previously operative stage inoperative.

A flip-flop of the bistable type is essentially a two stage multi-stable register.

The above devices are indicated by the main reference F for flip-flop and multi-stable registers, and by the main reference C for counters used as such or as distributors. The units of counters, etc. are numbered 1, 2, 3 . . ., following the main reference.

The phase inverter, shown as 61X in Fig. 5, is used to give a positive output where none exists, and vice-versa, and is described and claimed in U.S. Patent No. 2,688,695. In the case of register 61F, when 61FN is energized, a positive output 61F$n$.1 is obtained, but when some other element of 61F is energised, 61FN is quiescent, but a positive output is still required from it to signify this fact, as will be explained in the detailed circuit description. The use of inverter 61X enables a positive output 61F$n$.0 to be obtained.

This device is also used when one of the controls for a gate is to be of an inhibiting nature, i.e. prevent opening of the gate whatever the state of the other controls. A positive control is thus converted to be zero, thereby preventing opening of the gate.

Before passing on to a detailed description of the identification arrangements, it is desirable to give a brief account of the metering function with which they are closely associated. Full details may be found in the prior specifications referred to.

Figure 7A:
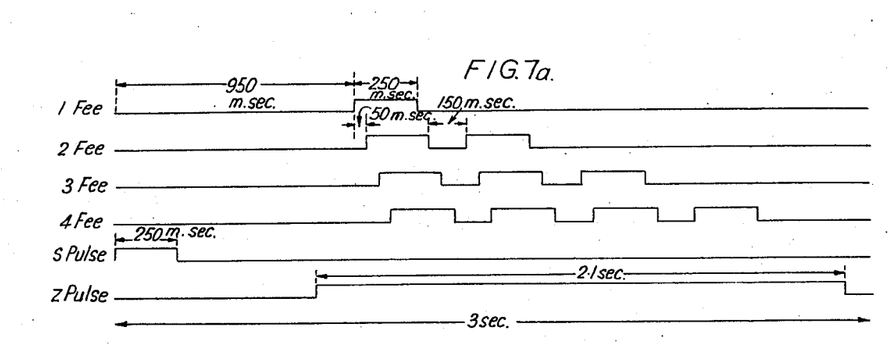

The standard arrangement for local metering in automatic telephone systems is to apply positive battery potential to the subscriber's P-wire during the release time of a relay in the final selector, while for multi-fee metering, the single battery potential is replaced by a waveform of 1, 2, 3 or 4 pulses applied during the existence of a so-called "Z" pulse in a cycle of "S" and "Z" pulses occupying 3 seconds and used for circuit control. The waveforms and their durations are illustrated in Fig. 7a, and are normally produced by a meter-pulse machine, an electric motor driving a series of cam-operated contact elements.

Figures 1, 1A:
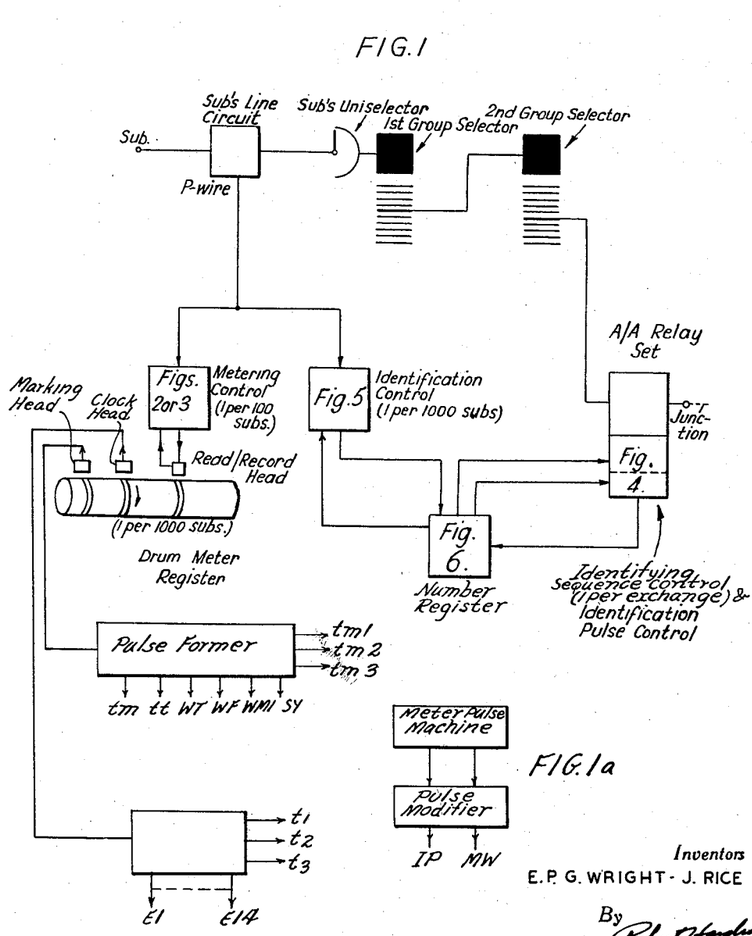
Fig. 1 shows the trunking arrangement for a non-director exchange with the metering circuit and the identification circuit included.
Fig. 1A shows a standard meter pulse machine with the pulses produced thereby indicated.
Figure 8:
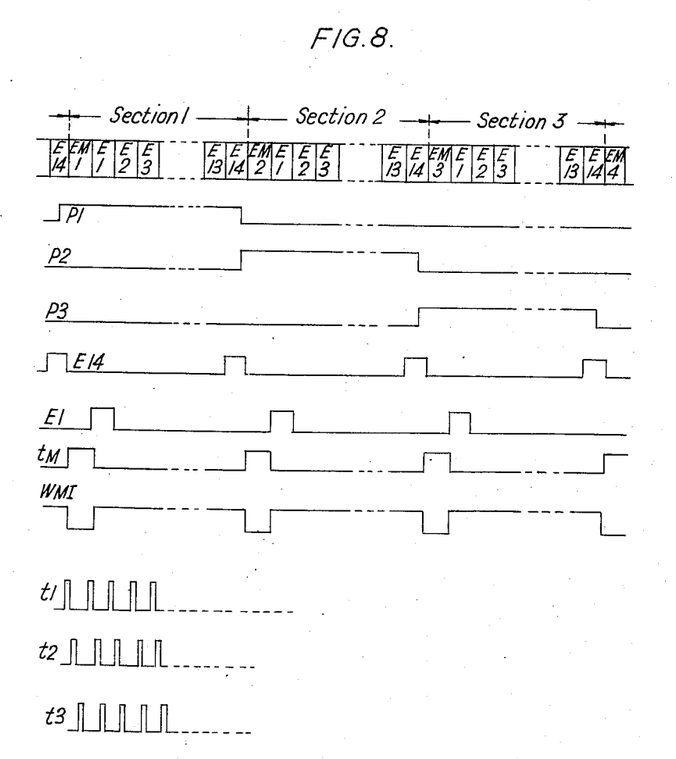
Fig. 8 shows the allocation of elements on the metering drum together with pulses used in the metering arrangement of said copending application No. 289,386, previously referred to, and for convenience used also in the identification circuits. This is substantially a reproduction of Fig. 2 of that application. It should be understood that such a set of pulses would be required for each drum used for metering in a single metering system, unless some form of speed synchronisation between drums is carried out so that common pulse sources can be used.

In magnetic drum metering, for example—see Figs. 1 and 8—a magnetic drum having an effective capacity of, say, ten tracks, is allocated to 1000 subscribers, 100 per track, each track being divided by so-called "chalk-mark" elements EM1, EM2, etc. into the individual subscriber's meter stores. Each individual store is further sub-divided into 14 binary elements, E1 etc., whereby binary counts up to about 16000 in binary form are possible.

Each metering section gives rise to an indexing pulse, or stated figuratively, an invisible "chalk-mark" pulse at the EM elements shown as waveform $t_M$ in Fig. 8, and each section is identified by an individual PN waveform which endures for one metering section, e.g. P1, P2, P3 . . . These are derived in the counter PC shown in Fig. 2, stepped at the centre ($t_2$) of each 14th E element (E14 waveform), and phased in accordance with the first track section by the special SY waveform (not shown) which produces a single pulse $t_M$ at the beginning of the metering track section. Such a waveform is shown in Fig. 16 of said application 289,386, referred to.

Figure 7B:
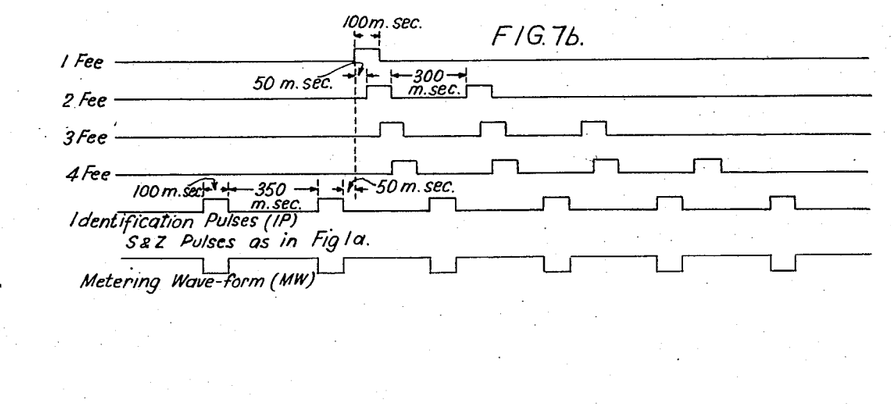

Additional to $t_M$ is its inverse, waveform WMI, which is positive for the counting section (E1–E14) of the metering section of each track portion, and, for the present extension to line identification, there is also a metering waveform MW and a line identification waveform IP, both shown in Fig. 7b. Fig. 7b will be further explained hereafter.

Figure 2:
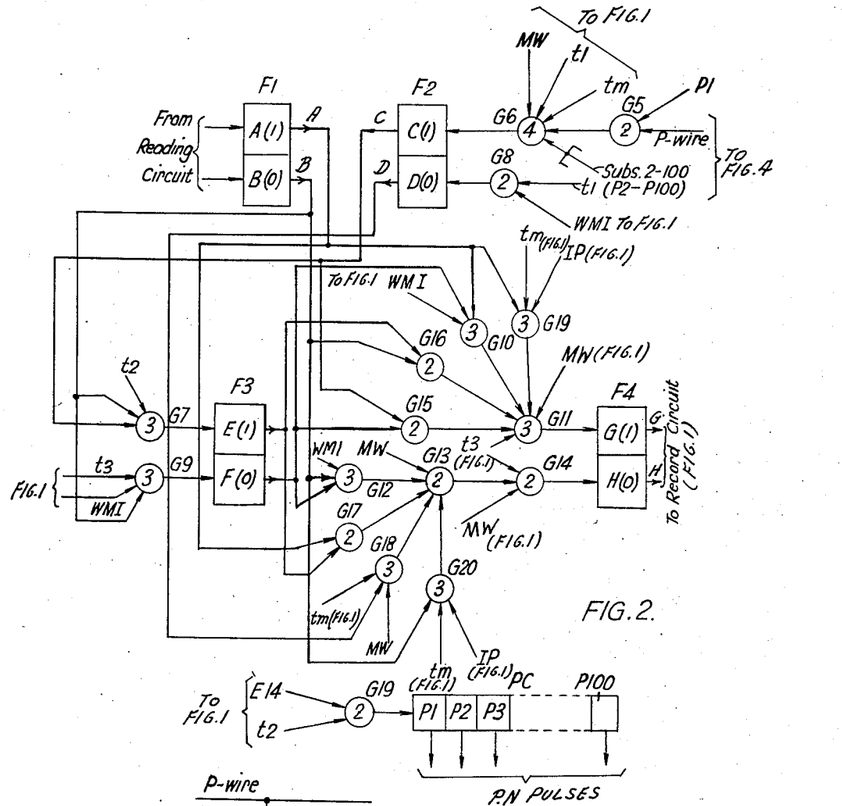
Fig. 2 shows a part of Fig. 5 of said copending application Ser. No. 289,386, above referred to, showing modifications necessary to accommodate identification pulse technique.
Figure 2A:
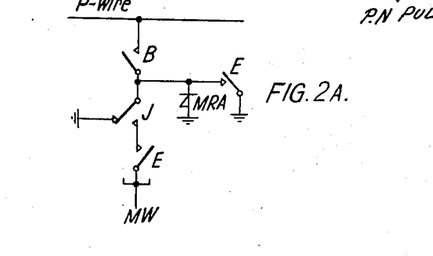

For local metering, Figs. 1 and 2, each read/record head is constantly scanning its associated track, and its associated bistable register of which one F1 (Fig. 2) is shown and which is controlled accordingly to position A or B for 1 or 0 in the track. Similarly, the various P-wires of the subscribers, (see Figs. 1 and 4), shown for metering control by MW in Fig. 2A, are applied in turn via gates such as G5, opened in association with a PN control, to a second bi-stable register F2, which includes an MW control (on gate G6). The addition control register F3, having controls B, C from F1 and F2, respectively determines whether the recording control register F4 shall record a meter total as read or shall increase its total by one. In the latter case, individual elements of the meter record are reversed up to, and including, the first 0.

Figure 3:
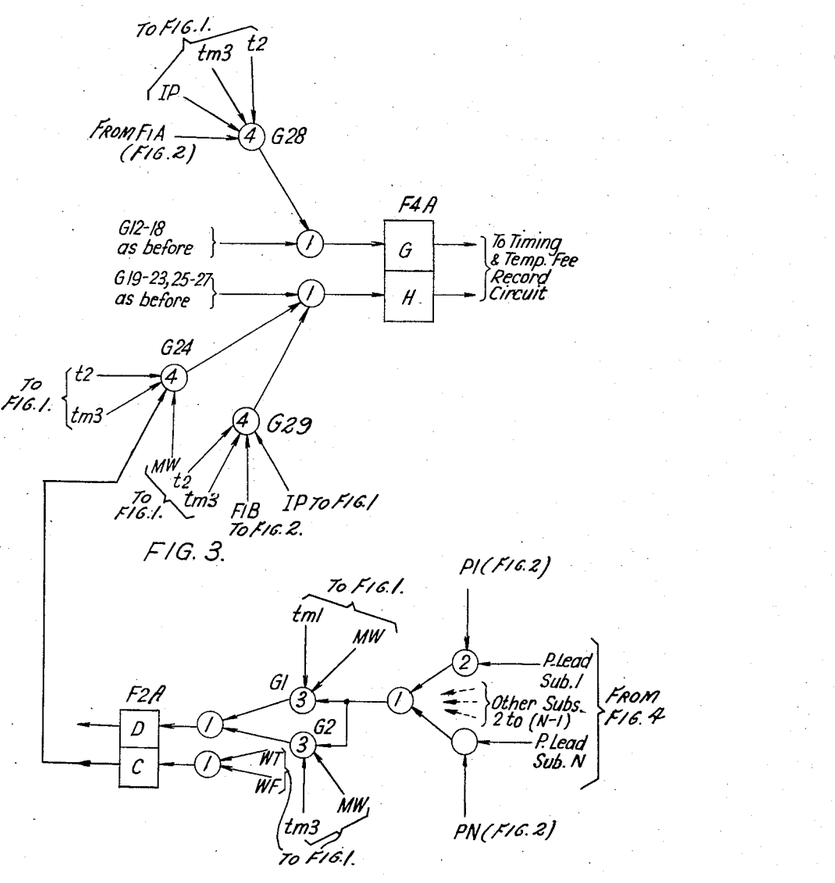
Figure 9:
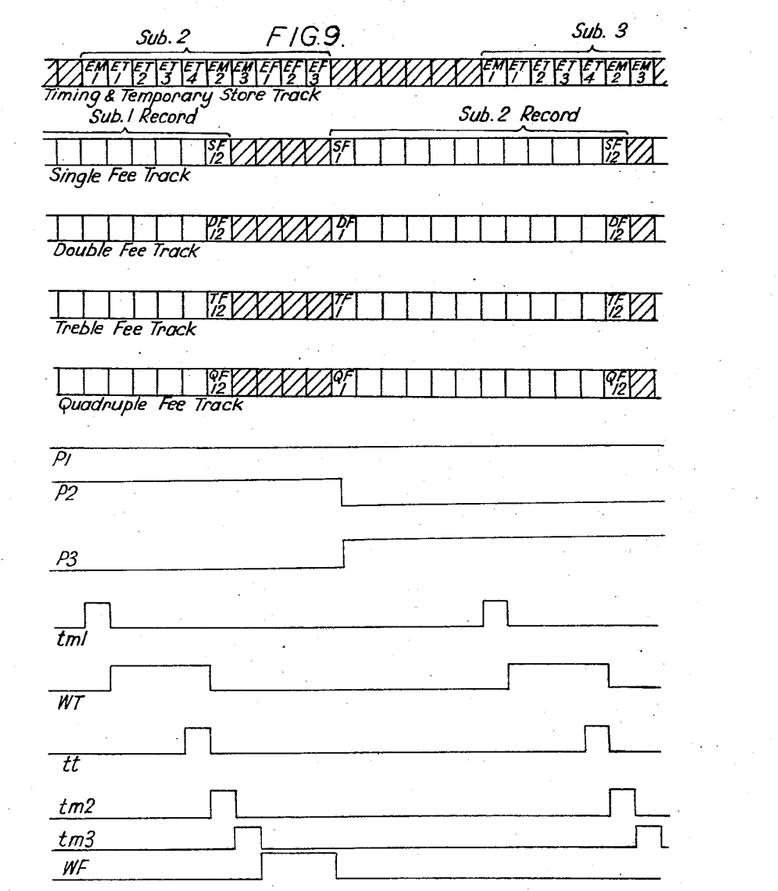
Fig. 9 is identical with Fig. 8, but with reference to said Patent No. 2,850,571, being a reproduction in part of Fig. 22 thereof.

The multi-fee system, illustrated in Fig. 9, with a small part of the circuit shown in Fig. 3, operates in somewhat similar manner. Each subscriber is allocated portions of 5 tracks, one a timing and temporary store for aggregating the meter pulses for a single call in the elements EF1, EF2 and EF3 (providing for a binary total of 7) during a timing period determined by rotations of the drum recorded in ET1–ET4, the remaining four sections being individual metering stores for various grades of fee, as shown. After the aggregation, the total in the temporary store is transferred to the appropriate fee track (by addition of 1 to the total therein) and the temporary store cleared.

F2A of Fig. 3 operates in similar manner to F2 of Fig. 2 to detect metering waveform (MW) pulses, and F4A controls the timing and temporary fee recording head.

Some of the necessary timing waveforms and pulse trains are included in Fig. 9, and will be self-explanatory from what has been previously described. These are shown here as being necessary for an understanding of the identification system to be described.

Figs. 2 and 3 will be discussed in more detail hereafter, to show the modifications necessary to the original circuits, from which they were extracted, to enable the identification system to work in conjunction with the metering systems illustrated.

The metering schemes referred to, and just outlined, make use of a magnetic drum which makes one revolution in a time less than either the duration of a metering pulse or the interval between metering pulses. This arrangement makes it possible to ensure that a metering pulse is examined at least once in each drum revolution, the "chalk mark" feature ensuring that one addition only is made for each metering pulse. The metering pulses produced by standard meter pulse machines last for 250 m.secs. with an off period of 150 m.secs., and thus the maximum time of the drum revolution should be less than 150 m.secs.

In the described arrangement for supplying multi-fee metering pulses, (Fig. 7a) the pulses are staggered so that for 1–4 fee pulses the minimum separation between metering pulses is 50 m.secs. only. It would be possible to arrange for an identification pulse, say of 30 m.secs. duration, to occur in this interval, requiring a drum revolution time of less than 30 m.secs. but the preferred arrangement is to shorten the metering pulses to 100 m.secs. (Fig. 7b) and have identification pulses also of 100 m.secs., the separation between metering pulses then being 300 m.secs., and between metering pulses and identification pulses being 50 m.secs. minimum; the latter giving sufficient interval to prevent interaction between the two sources of pulses. The metering pulse time permits a drum revolution time of less than 100 m.secs., say 80 m.secs., so making it possible to use practical circuit devices in the metering addition arrangement.

In the following it will be assumed as before that metering arrangements are based on 100 subscribers per track of the drum with 10 tracks per drum, i.e. one drum caters for 1000 subscribers. Further drums cater for other groups of 1000 subscribers. Other allocations are possible if suitable modifications are made to the metering and identification circuits to be described later.

The Calling Line Identification system will now be described particularly in relation to the multi-fee metering system described above, but it will be clear that this is purely by way of example, and the application to a local fee metering system would be substantially similar, the necessary timing pulses being changed.

*Circuit operation*

Figure 4:
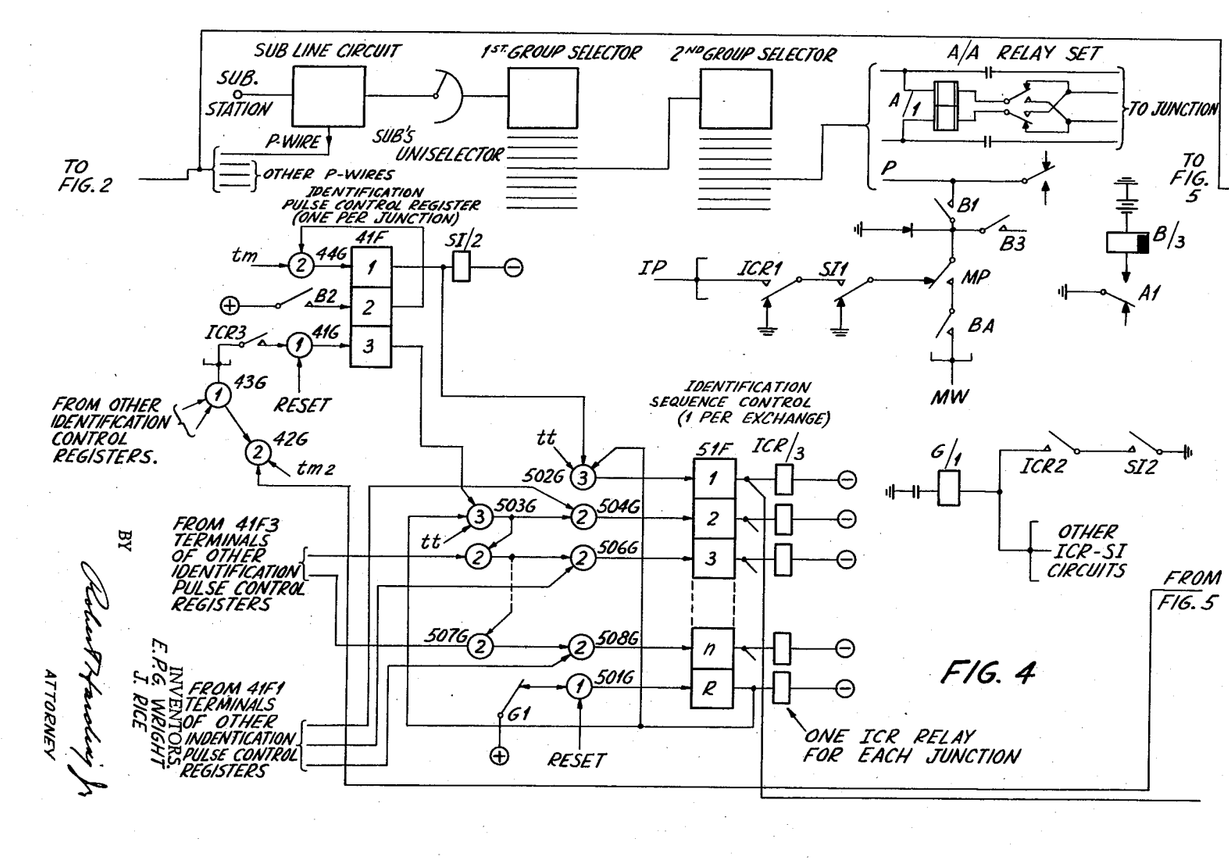
Fig. 4 shows the complete selection circuit from a subscriber's line to a junction, including part of the A/A (auto-to-auto) relay set (of Fig. 1), although this could be replaced by any selector giving access to junctions; the identification pulse control register, 41F, of which there is one per junction; and the identification sequence control register, of which there is one per exchange. The number of units in the register, 51F, would be dependent upon the number of A/A relay sets, one position being allocated to each outgoing junction. For a larger exchange the number of junctions could result in a register of impractical size. The solution in this case would be to divide the register into a number of smaller registers of the type shown in Fig. 4 and have a further register having one position for each of the first stage of registers. The final register would be similar to the first stages but would operate in a different time position.

When the subscriber dials the digits indicating a junction call, the 1st and 2nd group selectors will be stepped by the dialling impulses and the A/A relay set will be seized, see Figs. 1 and 4. This causes operation of the junction A relay (Fig. 4) and contact A1 operates relay B. Contact B1 operated applies earth from SI1 normal to the P-wire, which extends via the group selectors to the calling subscriber's line circuit. Contact B2 applies a positive signal to unit 2 of 41F, an Identification Pulse Control register associated with this junction, and causes 41f2 to be energised. Prior to this, 41f3 will have been energised either by a reset signal applied to gate 41G when the equipment is first switched on or, as will be seen later, by means of gate 42G and 43G. The first $tm1$ pulse to occur after 41f2 is energised will open gate 44G, 41f1 will be energised and relay SI operated. (The timing pulses and other waveforms referred to are those of Fig. 9.) The $tm1$ pulse applied to all such gates 44G in all the identification pulse controls is taken from one of the drum pulse sources. This device is used to effect synchronisation for later use of the output from 41f1, for the operation of relay B is at a random time in relation to the pulse operations used in other circuits.

Contact SI1 changes over, preparing the P-wire circuits for the application of the identification pulses, IP but at this time earth is still applied to the P-wire via ICR1 normal.

If at the time of energisation of 41f1 no other identification is taking place, 51F (Identifying Sequence Control) Fig. 4, will have 51FR energised. Assume that the identification pulse control being considered is the first, i.e. 41f1 (1) is energised. In consequence, the next $tt$ pulse will open 502G and 51f1 will be energised. 503G will remain closed, so that even should any other identification pulse control have been operated no other of the gates 504G—508G can open. As another example, assume that the junction being considered is the second and that no identification is required for the first. In this case, 41f3(1) and 41f1(2) will be energised and 41f1(1) and 41f3(2) will be non-energised, and the *tt* pulse will open 503G and 504G causing 51f2 to be energised. 502G and 505G will remain closed and so will 506G—508G even should any other identification pulse control have operated. As will be understood from the foregoing description, preference is given to the earlier circuits but, because of the short time required for identification, this would not be a serious disadvantage. However, it is evident that the identifying sequence control could quite easily be modified to an arrangement in which a pulse time allocation was given to each junction so that there would be random distribution for the junctions; or alternatively, an allotter function, as is often used in telephone practice, could be adopted. The circuit shown does give the simplest arrangement and would be quite suitable in practice for the reason given.

The energisation of 51f1 (or 51f2, as the case may be) causes relay ICR to operate and ICR2 operated completes the circuit prepared by S12 operated to operate relay G. G1 is the contact which, when released at a later stage of the operation, restores the identifying sequence control to its rest state in readiness for further identifications to take place.

Contact ICR1 operated (Fig. 4) now applies IP—the Identification Pulse train (Fig. 1A and Fig. 7b)—via SI1 operated and over the selection circuit and B1 operated to the P-wire of the subscriber connected to this junction. A drum section counter, 61C and 62C (Fig. 6), is arranged so that 61C makes one step for each section of metering storage allocated to a track on the drum and 62C makes one step for each cycle of 61C, that is, 61C gives the units position and 62C the tens position of the 100 storage sections of each track on the drum, being accurately phased with the rotation of the drum. Thus 61C will make 10 cycles and 62C will make one cycle during one revolution of the drum and, since the revolution time is less than the time in which pulse IP is applied to the P-wire there will be at least one coincidence in a gate such as 602G (Fig. 5).

The identification control includes a plurality of registers 61F, there being one such register for each 1000 subscribers' lines. Each register has ten sections, one for each group of 100 lines in the 1000 allotted to that register, and in addition, a normal section labeled N which is energized when the register is not in use. Inputs to each of the registers 61F are controlled by gates which are controlled by P wires from the subscriber's line circuits and the potentials from the drum section counter 61C and 62C. Section 1 of register 61F will be operated when any subscriber in the first 100 group of a particular group of 1000 initiates a call. Section 2 of register 61F will be energized when any subscriber in the second 100 group of the same group of 1000 initiates a call, and so on. Which section of the register operates will be determined by the particular P-wire connected to the gates.

If the calling line for which identification is required is the one defined by 61C1 and 62C1, its tens digit is 1 and its units digit is 1), 602G and 603G open if the particular P-wire is energized, and during pulse time *tm1* for the particular drum, 604G opens causing 61f1 to be energised. A control pulse IP is also applied to 604G so that identification cannot take place for a metering signal, for, as explained in relation to Fig. 1, and as seen in Fig. 7b, metering pulses and identification pulses cannot occur at the same time. 61f1 energised indicates that the calling line concerned is in the first 100-group and since for each 1000 subscribers there will be a register 61F, the register which no longer has 61Fn energised, i.e. 61fn.0 is positive, indicates the 1000 group.

Consider that the calling line concerned is number 6175. This means that *tm1* will cause 61f1 (the first hundred) in the register used for the 6th 1000-group to be energised when the drum section counter has 62C7 (the seventh ten) and 61C5 (the fifth unit) energised. Furthermore 61fn.0 in the register for the 6th 1000-group i.e. 61fn.0 (6), will be positive. This control, 61fn.0, plays an important part in the succeeding operations so far as they affect the tens and units digits of the identification.

It will be observed that each tens digit, for example, is controlled by a gate such as 616G having an element timing control (*tt*), a tens digit identifying control from 62C and a positive control from the 61F register in use, i.e. 61fn.0 positive. Since there may be up to ten 61F registers in the exchange and each must have a 61fn.0 control applied to each tens and units gate, but only one of these controls can be positive at any time, then clearly they must be separated in a complicated gating arrangement behind each of the 616G etc. gates, each such control being applied to each such gate through a separate series "one" input gate, as indicated by the small circle at 61G for instance in which is inscribed the numeral "1."

Thus, at time *tt* following the *tm1* pulse, and in the same combination of 61C and 62C elements, i.e. 62C7, 61C5, 614G—617G will open and pulses will be passed via the appropriate connections to the identifying sequence control (Fig. 4), the purpose of the latter being to direct the information to the correct A/A relay set calling line register (42F) (Fig. 6), of which there is one for each junction. Earlier it has been shown that if the junction is the first, then 51f1 (Fig. 4) will have been energised. Thus 509G, 510G (Fig. 6) and all other digit leads in the thousands, hundreds, tens and units leads associated with this junction will have been prepared by 51f1.

For example, calling line 6175, the gates in TH6, H1, T7 and U5 (Fig. 6) will be opened by the *tt* pulse and pulses passed to the calling line register in the AA relay set of the first junction. The pulse on U5 will cause 42f5(U) to be energised and similarly the appropriate elements of the other registers—42f6(Th), 42f1(H), and 42f7(T)—will also be energised.

As explained earlier these registers can be arranged in any form indicated by the manner in which the calling line identification is to be used. Sufficient for the purpose of this description to say that the information is now ready for further use.

After the contents of the calling line registers have been used, a Register Restore Signal must be passed, from the device used, to reset the register to its rest condition with 42FN energised. If the final recording device makes it possible for the circuit to be freed by the calling party before the contents of the calling line registers have been used, it would be possible to use a relay connected in the circuit of 42fn to busy the outgoing junction until the register restore signal had been received.

Since the calling line identification is now complete it is possible to restore conditions so that further identifications can take place. This is performed as follows. The *tm2* pulse (Fig. 9), following the *tt* pulse which passes the calling line information, opens gates 42G (Fig. 4) and 43G and applies a pulse to the common lead. Since the ICR relay (Fig. 4) of the junction being considered is the only one which can have operated in the identifying sequence control, this pulse can be applied only to the pertinent identification pulse control via ICR3 (Fig. 4) and gate 41G. 41f3 is energised causing 41F1 to extinguish and SI to be released. Contact SI1 disconnects the identification pulses from the P-wire concerned and reapplies earth. The same *tm2* pulse applied to 601G (Fig. 5) also restores 61F so that stage 61FN becomes energised.

Contact SI2 (Fig. 4) released breaks the circuit of relay G, and contact G1 releasing applies a positive potential to gate 501G causing 51FR to be energised, extinguishing 51F1 thereby releasing relay ICR. The circuit is now back to normal and should further circuits be requiring identification the identifying sequence control gates cause the next required unit of 51F to be energised and operation proceeds.

As shown in the drawings it is possible for 61F (Fig. 5) to keep operating and restoring during the release time of relay SI, causing further identification pulses to pass to the calling line registers but this would not cause false operation. However, should it be desired, a bi-stable register could be included in the identifying sequence control which would operate under control of the *tt* pulse which passes the identification and use the output of the register to cause 509G, 510G and other such gates to be closed. Release of contact G1 could restore this controlling register to its rest condition, for by that time contacts SI1 released (Fig. 4) will have removed application of the identification pulses to the P wire.

In Fig. 5, part of the metering addition circuit has been included to show the necessary modification to this circuit, and this will be more fully described shortly. Apart from the control metering wave-form shown in Fig. 7b as MW, 62F is substantially identical with the register F2 in Fig. 28 of said Patent No. 2,850,571 to note the arrival of metering pulses on a subscriber's P-wire. The purpose of pulse MW is to ensure that only pulses on the P-wire arriving during the metering period cause addition to take place, and that no addition is made for the identification pulses. Metering pulses are applied to the P-wire by MP (Fig. 4) with BA operated; since MP will be operated only during intervals when identification pulses are not being applied via ICR1 and SI1 operated it is possible for identification to take place even whilst metering is also taking place.

The detailed arrangement as herein described concerns itself with an identification scheme for use with a multi-fee metering arrangement. This is a simple matter to arrange, for the identification pulses, IP, do not coincide with the individual fee metering pulses—see Fig. 7b—and a machine could be arranged to give all the necessary pulses. It has been stated earlier that the arrangement is intended to operate in conjunction with metering schemes described in said copending application, Serial No. 289,386 and said Patent No. 2,850,571, after suitable modifications, since these metering schemes must be capable of dealing with the random type metering pulse which is given in local calls for the release time of the J relay in the final selector. Since the local case is also of importance, it is advisable to arrange the scheme to cover this type of metering, it being possible, at the same time, to cover the multi-fee form of metering. To do this no change in the actual identification equipment, as previously described, is required, the modifications being made to the metering arrangements so that the identification and metering will operate in conjunction, and also by the provision of an appropriate pulse in place of *tt*.

The standard arrangement for local metering (Fig. 2A) is to apply battery to the subscriber's P-wire during the release time of the J relay in the final selector. In the modified arrangement of Fig. 4 the metering battery is replaced by a signal MW which as can be seen in Fig. 7b, is the inverse of IP. This ensures that the local metering signal is not recognised as an identification signal and, by a suitable control, as has been described, it is possible to prevent an identification signal from being recognised as a metering signal. Various possibilities of occurrence of the random metering signals in relation to these waveforms do, however, arise.

It is possible that the random metering signal due to to the J relay could occur in time so that the whole signal lay between two consecutive pulses of IP, in which case the signal would be continuous and operation would be simple and as previously described.

Similarly, if part of the metering signal occurred before an IP pulse and part occurred after IP, but no metering coincidence occurred for the first part of the signal, again there would be no difficulty, for only that part of the metering signal following IP would give a coincidence and this would appear as a continuous signal. However, owing to the random nature of the signals, it is possible that in this case there could be a coincidence for both the first and second part, and since the metering signal disappeared during IP, the signal would, in fact, look like two metering pulses.

As will be remembered, when a metering signal is encountered, a "chalk mark" is recorded as "1" and remains in this condition until the metering signal disappears. Thus, the required modification is to ensure that, in the case being considered, the "chalk mark" remains during the existence of IP and is removed during the interval between IP pulses when the metering signal disappears. For all cases, the operation is to record "1" for the "chalk mark" and add one to the previous total when there is a coincidence between the particular recording section and a metering signal on the pertinent P-wire during an interval between pulses of IP; to retain "1" for the chalk mark and re-record the new total whilst the metering signal is present or interrupted during IP, and to record "0" for the "chalk mark" and re-record the new total when the first examination occurs for the recording section after the metering signal has disappeared during an interval between IP pulses.

Fig. 2 of the accompanying drawing reproduces in part the original Fig. 5 of said copending application No. 289,386 modified to operate for all forms of metering signal when used in conjunction with the calling line identification equipment. The original designations have been retained to avoid unnecessary complications. Fig. 3 shows that part of the circuit of said Patent No. 2,850,571 which requires modification, and comprises parts of Figs. 27 and 28 thereof. Note that 62F in Fig. 5 of the present application corresponds to F2 of Fig. 2 and F2A of Fig. 3, being, in particular, derived from F2 of Fig. 3. Since Fig. 2 is easier to describe and understand, this arrangement will be described in some detail, Fig. 3 being dealt with briefly for here the arrangement is more complex and it is sufficient merely to indicate the modifications, which operate similarly to those in Fig. 2.

With Fig. 2 is included at Fig. 2A that part of a final selector which concerns the operation to be described. Instead of the usual metering battery it can be seen that the waveform MW is applied to the P-wire via E, J and B contacts for metering purposes. Since E operates to release J, the waveform is applied for the release time of J. The only modifications to the remainder of the circuit are:

(i) MW is added as one of the controls of G6 and G18.

(ii) G19 and G20 are additional gates.

MW is added as one of the controls of G6 to ensure that F2 responds to metering signals only, i.e. no false metering occurs with IP on the P-wire. The reason for the other changes will be understood in due course.

First consider the case when no metering is taking place ("chalk mark" element is 0). F1 will operate in accordance with the information read from the recording track, F2 will have its stage D energised and F3 will have its stage F energised. For the "chalk mark" element, since a "0" is read (B of F1 is energised) and D of F2 is energised, either G18 or G20 will open, dependent upon whether *tm* occurs during MW or IP respectively, causing "0" to be recorded. For the WMI waveform (Fig. 8), G10 (Fig. 2) or G12 will open according to the state of F1 for a particular element and, in consequence, the recording will be the same as read. (See Figs. 7 and 8 for pulses and waveforms.)

Now consider the case when a metering signal occurs such that either the whole signal occurs during MW or, the similar case, no coincidence occurs for that part of the signal appearing before IP. Here it should be stated that the line examination period (the revolution time for a drum) must be less than the minimum time the local metering signal causes the P-wire to be positive, i.e. less than one-half of the excess of the release time of J over the duration of IP. In consequence, there will be a coincidence between, say, P1 and the metering signal during MW, G5 and G6 will open at time *t*1, *tm*, and stage C of F2 will be energised. At time *t*2, G7 opens to energise stage E of F3 so that, at time *t*3, G16 and G11 open to energise stage G of FA causing "1" to be recorded in the "chalk mark" element. At time *t*1, at the beginning of WMI, G8 opens to re-energise stage D of F2. G16 and G17 now cause the remainder of the metering record to be reversed up to and including the first "0" read by F1, at which stage, at time *t*3, G9 opens to energise stage F of F3, after which G10 and G12 cause the record to be made as read; one has now been added to the previous total.

For further coincidences during MW, although stage C of F2 will be energised, stage E of F3 cannot be energised since stage A of F1 will now be energised in the "chalk mark" element owing to the recorded "1." G15 re-records the "chalk mark" and G10 and G12 re-record the metering information. The metering signal disappears during the same MW and for the next appearance of P1, G5 and G6 remain closed, leaving stage D of F2 energised. Thus, G18 opens to cause the "chalk mark" to be recorded as "0" and the remaining information is again recorded by G10 and G12.

The last case to be considered is that in which metering occurs for a time such that a signal appears on the P-wire partly before and partly after IP, and a coincidence with P1 occurs for both sections of the metering signal. The object is to ensure that one only is added to the meter record even though the break in the metering signal during IP makes it look like two distinct signals.

For the first coincidence, the recording of "1" in the "chalk mark" element position and the addition of one to the metering information take place as described above and further coincidences, if any, during the first part of the metering signal cause no change. During the IP pulse, the signal disappears from the P-wire so that for a coincidence during IP, IP also lasting for longer than the examination period, F2 remains with its stage D energised and F3 remains with its stage F energised, both stages B of F1 and C of F2 being non-energised during the "chalk mark" element. However, for this element, G18 is closed due to absence of MW but G19 will open and "1" is again recorded in the "chalk mark" element. As previously G10 and G12 re-record the metering information. This occurs for any further coincidences during IP. After IP, the metering signal will cause the P-wire to become positive once again so that, for the next coincidence, stage C of Fig. 2 will be energised but, since the "chalk mark" has been retained as "1," G7 remains closed and stage F of F3 remains energised. G15 causes the "chalk mark" element to be recorded as "1" and, as before, G10 and G12 re-record the remaining information.

Thus, in spite of the break in the metering signal, one only has been added just as if the signal had remained positive throughout.

When the metering signal finally disappears, say during MW, stage D of F2 will remain energised at the next appearance of the recording section, stage F of F3 will remain energised and, in consequence, G18 causes the "chalk mark" element to be recorded as "0" and the information will be re-recorded as before by G10 and G12. If the metering signal had finally disappeared during IP, the "chalk mark" would have been retained as "1" during IP, as described above, and finally recorded as "0" for the first coincidence during MW.

In the foregoing, the random local metering signal has been considered but it is obvious that the arrangement also operates for the time related multi-fee pulses; the operation for the latter is the same as that given for the case when the local signal appears entirely in the interval between IP pulses.

A brief description will now be given of the modifications required in the arrangement of said Patent No. 2,850,571 to make it possible to use it with the identification equipment when local metering signals may be encountered. One change has already been indicated in Fig. 6 of the accompanying drawing, wherein MW has been added as a control to 624G (Fig. 6) to prevent, as already described, metering addition taking place for an identification signal. 624G is compounded of G1 and G2 of Fig. 3. The only other changes are in relation to part of the gating arrangement of F4, and these will now be described with reference to flip-flop F4A of Fig. 3, which, as stated earlier, is a modification of Fig. 28 of said Patent No. 2,850,571.

These changes consist of an extra control, MW, added to the gate G24 formerly consisting of *t*2, *tm*3 and F2C, a new gate G28 consisting of *t*2, *tm*3, IP and F1A added to control F4AG and a new gate G29 consisting of *t*2, *tm*3, IP and F1B added to control F4AH. These gates respectively perform the functions equivalent to those performed by G18, G19 and G20 in the above description. Again the battery giving the local metering signal is replaced by the new waveform MW. No changes in respect of the timing and transfer parts of the equipment are required, for, even when a local metering signal is removed during IP, although the timing section will be wiped out and new timing takes place during IP, the required time interval cannot elapse to cause transfer to take place before the signal reappears after IP. The modifications ensure that, for a local signal, one only is recorded in the temporary fee store and, when the signal is found to be absent during the MW waveform, after sufficient time has elapsed from the end of the signal, one will be transferred to the unit fee permanent store, as described in said Patent No. 2,850,571.

No method of initiating identification has been indicated for the final selector such a requirement being extremely unlikely, there being no necessity to have calling line record for a local call. However, there is no technical reason why it could not be done, an arrangement similar to that previously described being sufficient.

Further, no provision has been made in the circuitry to deal with the case when a calling party releases before identification has been completed, but again this is unlikely owing to the short time required. However, this contingency could be covered by preventing the release of the train of selectors until after identification by using an SI contact (Fig. 4) to hold relay B operated even should relay A be released by the subscriber.

As described, the seizure of the A/A relay set (Figs. 1A and 4) has been used to operate the identification pulse control. If desired the initiation of identification could be carried out, say, by a DD contact (not shown) replacing B2 (Fig. 4), DD being associated with the relay which operates when the called party answers. This would mean that identification would be carried out for completed calls only. Other variations are possible, for example the system as described could be incorporated into an identification system in which an operator initiated identification. As will be understood from the above description the identification system is not limited to the non-director trunking scheme used by way of example. The operation of 41*f*2 could be performed in any group selector or for a director trunking scheme by the first code selector or any other selector in the train.

While the principles of the invention have been described above in connection with specific embodiments, and particular modifications thereof, it is to be clearly understood that this description is made only by way of example and not as a limitation on the scope of the invention.

What we claim is:

1. Telecommunications exchange meter apparatus comprising a group of substation line circuits, generating means for generating metering signals, means for generating line identification signals, said metering signals and said identification signals having different characteristics, means for applying said metering signals and said identification signals to said line circuits, a plurality of storage means each individual to a different one of said line circuits for storing metering signals applicable to its associated line circuit, scanning means for cyclically scanning said storage means, means for generating a cycle of control pulses, one cycle per storage means, said last named generating means operable during operation of said scanning means and under control thereof a plurality of sets of coincidence gates, one set for each of said line circuits and individual thereto, each set comprising a metering gate and an identification gate and adapted respectively to pass metering and identification pulses, number recording means for recording identification pulses individual to said line circuits, impulse counting means for counting pulses from said pulse cycle, transfer equipment operable under control of said identification gates, said metering gates disposed between said impulse counting means and said number recording means and adapted to be actuated by the concident application thereto of an impulse derived from said impulse counting means and an associated identification gate, whereby metering signals and identification signals present on said line circuits are detected separately so that a metering signal is applied to the associated meter gate on a signalling line circuit and an identification signal is applied to the corresponding identification gate, both types of signals adapted to cause opening of their associated gates under coincident control of the characteristic signals and predetermined pulses from corresponding of said metering generating means or said identification signal generating means and said control pulse generating means thereby to control identification and metering of said line circuit.

2. Telecommunication exchange equipment as claimed in claim 1 and in which the said identification signal generating means comprises a multi-stable device per line circuit subject to a random signal from a line circuit to be identified for changing the state of stability of the said device, and a second multi-stable device allocated to a group of line circuits and operable in response to the change of state of said first multi-stable device to cause an identification signal to be transmitted to said line circuit to be identified and to exclude all others of said group of line circuits while an identification is taking place.

3. Telecommunication exchange equipment as claimed in claim 2 and in which the said identification signal comprises a waveform which is effective for at least the duration of scan of said metering equipments.

4. Telecommunication exchange equipment as claimed in claim 3, and in which said metering signals comprise a waveform which is the inverse of said identification signal waveform.

5. Telecommunication exchange equipment as claimed in claim 1 and further comprising additional counting means, registering means coupled to said groups of line circuits, identifiable in association with said additional counting means appropriate only to a smaller group, whereby each level, or section, of the said registering means is allocated to a different one of said smaller groups, and provides a distinctive identification signal to said number recording means.

6. Telecommunication exchange equipment as claimed in claim 5, and comprising a plurality of said registering means for extending the identifications possible with a single equipment to a still larger group of line circuits.

7. Telecommunication exchange equipment as claimed in preceding claim 1, and in which storage means comprises a magnetic drum or like equipment having a recording track section per line circuit.

References Cited in the file of this patent

UNITED STATES PATENTS

| | | |
|---|---|---|
| 2,165,924 | Goodrum | July 11, 1939 |
| 2,165,925 | Goodrum | July 11, 1939 |
| 2,252,766 | Holden | Aug. 19, 1941 |
| 2,270,246 | Bascom et al. | Jan. 20, 1942 |
| 2,297,365 | Ostline | Sept. 29, 1942 |
| 2,513,112 | Shepherd | June 27, 1950 |
| 2,540,654 | Cohen et al. | Feb. 6, 1951 |
| 2,549,071 | Cohen et al. | Apr. 17, 1951 |
| 2,652,554 | Williams et al. | Sept. 15, 1953 |
| 2,675,427 | Newby | Apr. 13, 1954 |
| 2,679,551 | Newby | May 25, 1954 |
| 2,680,239 | Daniels et al. | June 1, 1954 |
| 2,723,311 | Malthaner et al. | Nov. 8, 1955 |